(12) United States Patent
Jinaraj et al.

(10) Patent No.: US 9,489,543 B2
(45) Date of Patent: Nov. 8, 2016

(54) SUPPORTING PORT SECURITY ON POWER-OVER-ETHERNET ENABLED PORTS

(71) Applicant: DELL PRODUCTS L.P., Round Rock, TX (US)

(72) Inventors: Suresh Jinaraj, Chennai (IN); Shathish Muthu Venkatesan, Pulavar nagar Vellore (IN); Ramakrishnan Shanmugasundaram, Chennai (IN); Premnath Sundarababu, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 14/463,278

(22) Filed: Aug. 19, 2014

(65) Prior Publication Data

US 2016/0055354 A1  Feb. 25, 2016

(51) Int. Cl.
*G06F 21/00* (2013.01)
*G06F 21/81* (2013.01)

(52) U.S. Cl.
CPC ..................................... *G06F 21/81* (2013.01)

(58) Field of Classification Search
CPC ........ G06F 21/70; G06F 21/81; G06F 1/266; H04W 12/08; H04W 88/08; H04L 63/00; H04L 63/10; H04L 63/08; H04L 63/0876

USPC ............................................................ 726/36
See application file for complete search history.

(56) References Cited

U.S. PATENT DOCUMENTS

| | | | |
|---|---|---|---|
| 2005/0229016 A1* | 10/2005 | Addy ............................. | 713/300 |
| 2007/0058598 A1* | 3/2007 | Ling ............................. | 370/338 |
| 2007/0135086 A1* | 6/2007 | Stanford .................. | H04L 12/10 455/402 |
| 2008/0005600 A1* | 1/2008 | Diab ..................... | G06F 1/3209 713/300 |
| 2014/0282905 A1* | 9/2014 | Iyer et al. ......................... | 726/4 |

\* cited by examiner

*Primary Examiner* — Yogesh Paliwal
(74) *Attorney, Agent, or Firm* — North Weber & Baugh LLP

(57) ABSTRACT

Embodiments of the present invention include systems and methods for controlling power delivery to a port in a power sourcing equipment. The power sourcing equipment receives identity information from a device connected to the port and determines whether the device is a trusted device or a rogue device according to a security policy. If the device is a trusted device, the power sourcing equipment supplies data and electrical power to the port according to a priority policy. If the device is a rogue device, the power source equipment does not supply electrical power to the port.

20 Claims, 4 Drawing Sheets

SUPPORTING PORT SECURITY ON POWER-OVER-ETHERNET ENABLED PORTS

TECHNICAL FIELD

The present invention relates to managing power supply to Ethernet ports, more particularly, to systems and methods for controlling power supply to power-over-Ethernet (PoE) ports.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A power-over-Ethernet (PoE) device refers to any of several standardized or ad-hoc systems which pass electrical power along with data on Ethernet cabling. A PoE device, or shortly PoE, allows a single cable to provide electrical power as well as data connection to devices, such as IP cameras. The electrical power may be carried on the same conducting lines as the data, or it may be carried on separate conducting lines in the same cable.

Typically, a PoE standard device, such as switch having one or more PoE ports, can provide up to 15.4 W of DC power. Other PoE devices have power supplies that can provide higher levels of electrical power. For example, a PoE+ device can provide up to 25.5 W. In another example, a Universal Power Over Ethernet (UPoE) device extends the IEEE Power Over Ethernet Plus (PoE+) to provide 60 W per port.

In general, a conventional PoE device has a port security device that controls connectivity to one or more rogue devices in the network. Typically, the existing port security device shuts down data flow via a PoE port connected to a rogue device when the rogue device violates the security code. However, the rogue device can still draw electrical power from the conventional PoE device even when the data flow is shut down. Such a power loss to the rogue device, which reduces the available power in the power bank of the PoE device, significantly impacts the performance of the PoE device in delivering power to authorized devices.

In addition to controlling the power delivery to rogue devices, the user of a PoE device needs an efficient way to prioritize the trusted powered devices (PDs) connected to the ports of the PoE device. Thus, there is a need for an efficient way to prioritize the trusted PDs so that the electrical power in the power bank of the PoE device can be used in an optimal way.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

Furthermore, connections between components within the figures are not intended to be limited to direct connections. Rather, data between these components may be modified, re-formatted, or otherwise changed by intermediary components or devices. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 1:
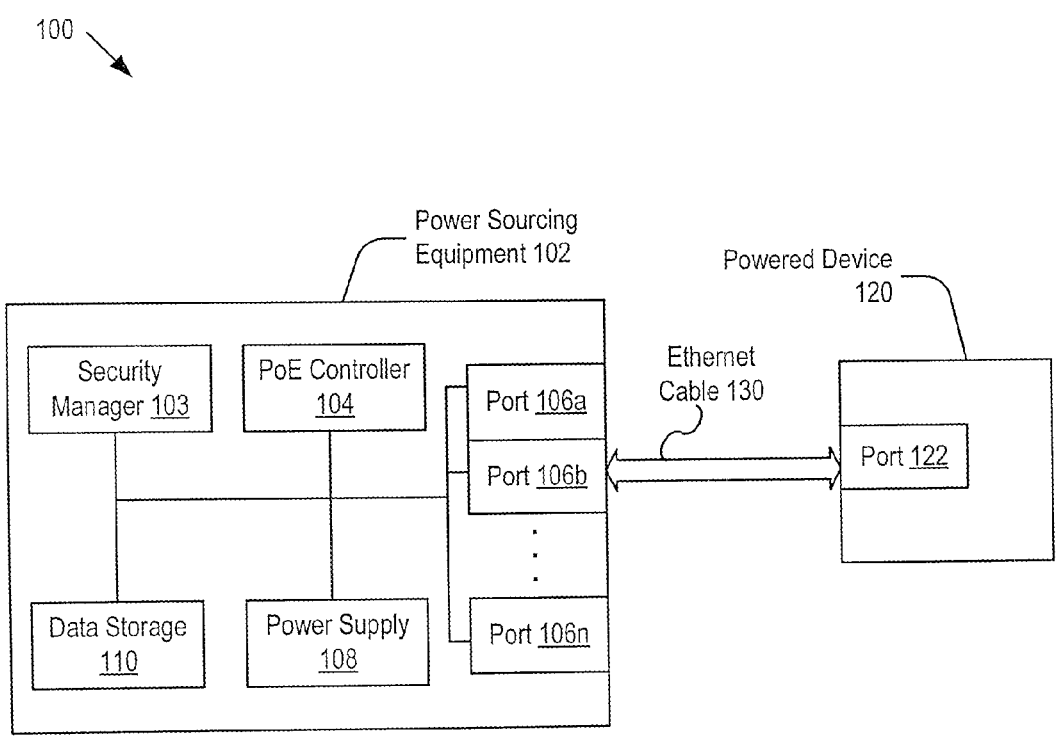
FIG. 1 shows a schematic diagram of a power sourcing equipment (PSE) connected to a powered device (PD) according to embodiments of the present invention.

FIG. 1 shows a schematic diagram 100 of a power sourcing equipment (PSE) connected to a powered device (PD) according to embodiments of the present invention. As depicted, the PSE 102 is a PoE device, such as PoE switch, and may include: a PoE controller 104, a security manager 103, one or more ports 106, a power supply 108, and data storage 110. In embodiments, the components in the PSE 102 are connected to each other by a suitable connection mechanism and communicate to each other. The PoE controller 104 controls the flow of electrical power from the power supply 108 to the ports 106 and the flow of data from the data storage 110 to the ports 106. It is noted that only one power supply 108 and one data storage 110 are shown in FIG. 1 for brevity. However, it should be apparent to those of ordinary skill in the art that other suitable number of power supplies and data storages may be included in the PSE 102. Also, it should be apparent to those of ordinary skill in the art that the power supply 108 and/or data storage 110 may be located outside the PSE 102.

In embodiments, the PoE controller 104 and the security manager 103 may be installed in the same module. Also, the operating system of the PSE 102 may be combined with one or more of the PoE controller 104 and the security manager 103.

The PSE 102 may transfer data and electrical power to the PD 120 via an Ethernet cable 130. In embodiments, electrical power is carried on the same conductors as the data in the Ethernet cable 130. Alternatively, electrical power is carried on dedicated conductors in the Ethernet cable 130. The PD 120 may be any suitable device, such as Voice-over-internet-protocol (VoIP) phone, IP camera, webcam, wireless access point, internet-protocol-television (IPTV) decoder, and network router, that has at least one port 122 for communicating data and receiving electrical power from a port of the PSE 102.

The user of the PSE 102 may create security policies. In embodiments, according to the security policies, the security manager 103 may generate a list of trusted devices and store the list in the PSE 102 or any other suitable storage that the security manager 103 can access. For instance, the user may manually specify a set of MAC addresses and/or serial numbers in the list. In another example, the user may gather the MAC address and/or serial numbers after initial configuration of PDs and store the gathered information to the list, such as startup-config file. In yet another example, the user may select a field in the TLV, such as the model name field, and specify a set of values for the field in the list. Here, the term "a set of values" refers to one or more values in the list. If the PD 120 is in the list, it will be allowed to receive data and electrical power from the PSE 102.

The port 122 of the PD 120 is connected to one of the ports 106, say 106b, in the PSE 102 via the Ethernet cable 130. To initiate data transfer, the PD 120 may send a data packet or a signal including one or more indicators that contain identify information of the PD 120. (Hereinafter, the terms port and interface are used interchangeably.) In embodiments, the one or more indicators may include media-access-control (MAC) address and/or one or more type-length-value (TLV) fields supported in link-layer-discovery-protocol media-endpoint-discovery (LLDP-MED), such as serial number in an inventory-management TLV. It should be apparent to those of ordinary skill in the art that the one or more indicators may include other suitable information of the PD 120, such as vendor name and power capacity.

The security manager 103 determines whether the PD 120 is a trusted device or a rogue device. In embodiments, a port, say 106b, receives the indicia and forwards the information to the security manager 103. Then, using the information, the security manager 103 checks whether the PD 120 is in the list of trusted devices. In embodiments, this authentication process is performed on per-port level or per-system level. On per-port level, the security manager 103 checks whether the PD 120 is in the list of trusted devices for a particular port and, if so, the PD 120 is authenticated for the particular port only. The authentication on per-port level is useful when the user wants to prevent the PD 120 from switching the port in the PSE 102. For example, a user of VOIP phone is not allowed to use another user's Ethernet terminal port. On per-system level, the PD 102 is authenticated for a portion or all of the ports 106 in the PSE 102.

When more than one trusted PD is connected to the ports 106, the PSE 102 may prioritize the trusted PDs to control distribution of electrical power among them. In embodiments, the user of the PSE 102 may create priority policies. According to the policies and the one or more indicators received from the PD 120, the security manager 103 may assign a priority to each PD 120. For the purpose of illustration, assume that the priority policies include

```
poe priority-policy poe_user_config
    match serial-number XYZ set priority 5
    match MAC AA:AA:AA:AA:AA:AA set priority 10
```

If the indicators sent by the PD 120 include an LLDP TLV and the serial-number field of the TLV has a value of "XYZ," the PD 120 will be assigned a priority of 5 according to the priority policies. Likewise, if the indicators sent by the PD 120 include a MAC address and the MAC address has a value of "AA:AA:AA:AA:AA:AA," the PD 120 will be assigned a priority of 10. Assigning priorities to PDs is helpful when the power supply 108 has limited power in its power bank and it is necessary to decide upon which PD to power on.

It is noted that the exemplary priority policy set forth above includes two priority values for two different types of indicators. If the serial number and MAC address of the PD 120 are "XYZ" and "AA:AA:AA:AA:AA:AA," respectively, the PD 120 has two priority values. In such a case, the user of the PSE 102 may choose the priority value for the first indicator of the priority policies and ignore the other priority values. In the present example, the PD 120 will be assigned a priority of 5.

In embodiments, the priority policies are applied on per-port level or per-system level. On per-port level, the security manager 103 assigns a priority to the PD 120 for a particular port only. As such, one PD may have different priorities for different ports. On per-system level, the PD 120 is assigned one priority for a portion or all of the ports 106 in the PSE 102.

When the PD 120 is authenticated by the security manager 103, the PoE controller 104 may send data to the PD 120 via the Ethernet cable 130. Also, the PoE controller 104 may control the power supply 108 so that the power supply 108 may provide electrical power to the PD 120 via the port 106b and Ethernet cable 130 according to the priority assigned to the PD 120. If the PD 120 is not in the list of trusted devices, the PD 120 is considered a rogue device and the security manager 103 moves the port 106b into an unauthorized state. In the unauthorized state, the PoE controller 104 stops providing data and electrical power to the port 106b even if the power required by the PD 120 is available in the power supply 108. The port 106b remains in the unauthorized state until the security controller 103 receives from the PoE controller 104 a notification that the PD 120 was disconnected or there is a change in the security policies.

In embodiments, the PoE controller 104 may continuously monitor the port 106b to determine whether the PD 120 is disconnected from the port 106b. To monitor the port 106b, a preset electrical voltage may be applied between two pins of the port 106b so that electrical current flows through the two pins when the Ethernet cable 130 is connected to the port 106b. When the Ethernet cable 130 is disconnected from the port 106b, the current flow stops and the PoE controller 104 sends the security manager 103 a notification that the PD 120 was disconnected.

When the rogue device is disconnected from the port 106b, a "device disconnect" event is triggered by the port 106b and the port 106b sends a notification to the PoE controller 104. Then, the PoE controller 104 informs the security manager 103 of the event and the security manager 103 will move the port 106b from the unauthorized state to a state ready for a new PD.

For the purpose of illustration, assume that the user of a PSE wants to connect a PD, which has a MAC address of 11:11:11:11:11:11, to a port 0/0 of the PSE. To secure the port 0/0, the user may set a security policy by configuring the PSE so that the PD is a trust device on the port 0/0. For example, the user may specify ---
Interface gi 0/0
Switchport port-security MAC-address 11:11:11:11:11:11
---

When the PD is connected, the security manager will authenticate the PD so that the PD receives electrical power via the port 0/0. However, if a rogue PD having a MAC address 22:22:22:22:22:22 is connected to the port 0/0, the PSE would disable only the port 0/0, while the other ports of the PSE remains active. The port 0/0 remains in the unauthorized state until the rogue PD is disconnected from the port 0/0 or the user of the PSE changes the switchport configuration.

There may be cases where the user of PSE 102 does not want certain types of PDs to be connected to the ports 106. For example, the user may not want an IP camera to be connected to the ports 106. In another example, the user may not want devices that have "LLPD-MED class" value as 3 to be connected to any one of the ports 106 in the PSE 102. In embodiments, the user may specify a particular TLV, such as the LLPD-MED class, as a match criterion and add it to a deny list, where the deny list can be stored and accessed by the security manager 103. When the security manager 103 receives the indicia from the PD 120 and finds the PD in the deny list, the PoE controller 104 would not send any data or electrical power to the port that the PD is connected to.

In embodiments, the deny policies are applied on per-port level or per-system level. On per-port level, the security manager 103 denies connection to a rogue PD for a particular port only. On per-system level, the security manager 103 denies connection to a rogue PD for all of the ports 106 in the PSE 102. Hereinafter, for brevity, the term security policies collectively refer to the security policies and the deny policies. Also, the term "rogue device" refers to a device that is not on the trusted list or a device that is on the deny list.

In embodiments, when the security manager 103 determines that the PD 120 is a rogue device, the port 106b is moved into an unauthorized state and the PSE 102 may send a notification to the user through syslogs or any other suitable mechanism, such as simple-network-management-protocol (SNMP) traps and "show" commands. Unlike the conventional systems, the PSE 102 cuts off the flow of electrical power from the power supply 108 to the PD 120 even though the electrical power is available in the power supply 108. This ensures that the electrical power is delivered to only trusted devices and is not misused by rogue devices. In embodiments, since the security manager 103 performs the authorization of the PD 120, this unauthorized state is transparent to the PoE controller 104, i.e., implementation of the security and deny policies would not require any change to the logic of the PoE controller 104.

Figure 2:
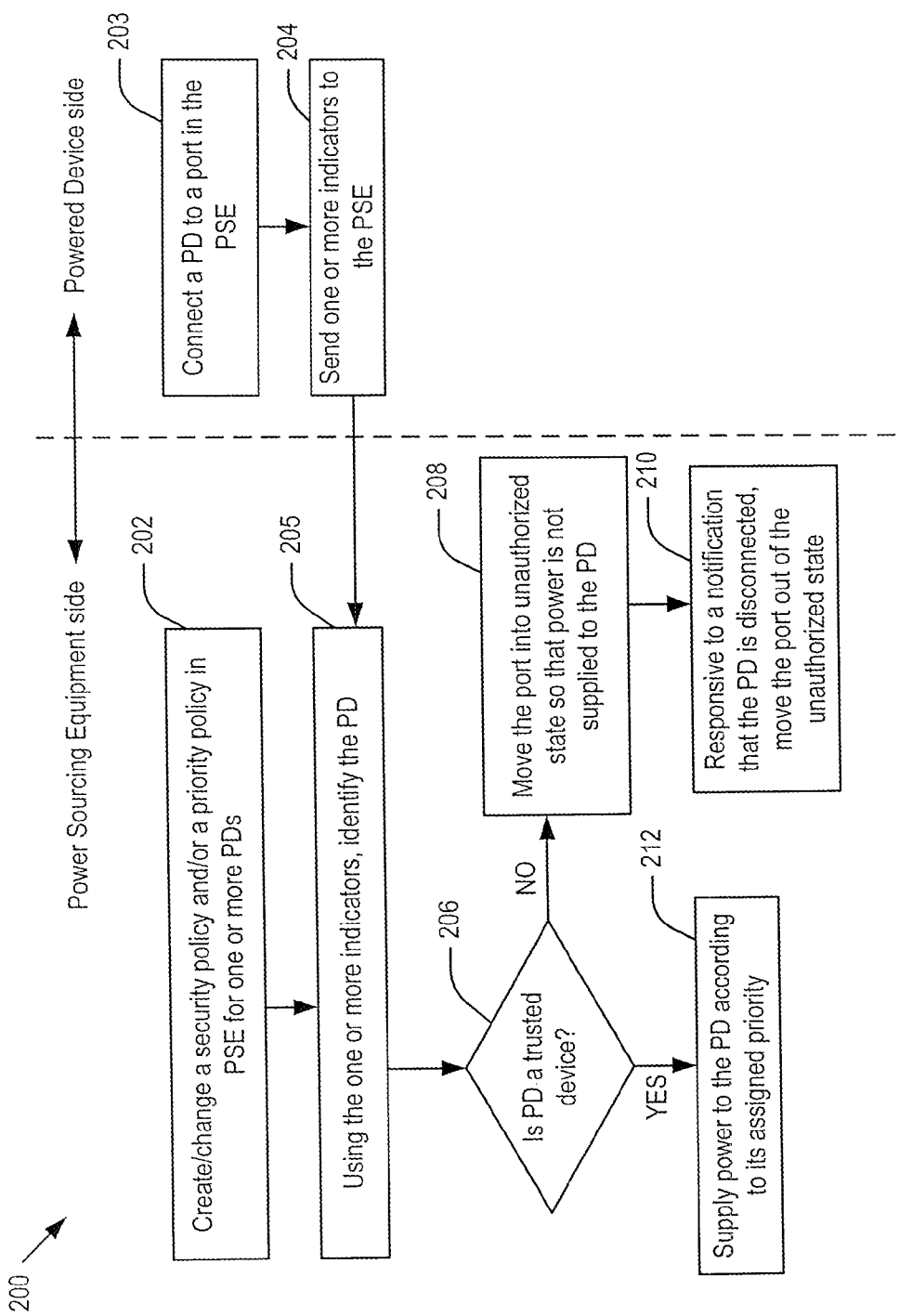
FIG. 2 shows a flowchart of an illustrative process for controlling power delivery to a PD according to embodiments of the present invention.

FIG. 2 shows a flowchart 200 of an illustrative process for controlling power delivery to a PD according to embodiments of the present invention. At step 202, the user of the PSE 102 creates security policies and/or priority policies in the PSE 102 for one or more PDs. In embodiments, the user may manually specify a set of MAC addresses and/or serial numbers in the list of trusted PDs. In another example, the user may select one or more TLV fields, such as the model name field, and specify a set of model names in the list. In yet another example, the user may create a security policy for a deny list. In embodiments, the user may change the existing security and/or priority policies. Then, according to the policies, a list of trusted PDs is generated. Also, the user may also assign a priority to a set of elements in the list.

At step 203, the PD 120 is connected to the port 106b in the PSE 102 via the Ethernet cable 130. Then, at step 204, the PD 120 sends one or more indicators to the PSE 102, where the one or more indicators contain the identity information of the PD device 120. In embodiments, the one or more indicators include at least one of MAC address, serial number, value in one or more TLV fields, vendor name, and power capacity. Next, at step 205, the security manager 103 uses the one or more indicators to identify the PD 120.

At step 206, the security manager 103 determines whether the PD 120 is a trusted device or a rogue device using the one or more indicators. In embodiments, the security manager 103 may look up the list of trusted PDs and check if the PD is in the list. If the PD is in the trusted PD list, the process proceeds to step 212. Alternatively, the security manager 103 may look up the list of deny list and check if the PD is in the deny list. If the PD is not in the deny list, the process proceeds to step 212.

At step 212, the security device assigns a priority to the PD 120 according to the priority policy so that the PoE controller 104 can provide electrical power to the PD 120 according to the assigned priority. If the security manager 103 determines that PD is a rogue device at step 206, the process proceeds to step 208.

At step 208, the security manager 103 moves the port 106b into an unauthorized state so that the electrical power is not provided to the port 106b. Also, in embodiments, the PSE 102 sends a notification to the user through syslogs or any other suitable mechanism, such as simple-network-management-protocol (SNMP) traps and "show" commands. The port 106b remains in the unauthorized state until the PoE controller 104 receives a notice from the port 106b that the rogue device is disconnected at step 210. At step 210, the security manager 103 would move the port 106b out of the unauthorized state.

Figure 3:
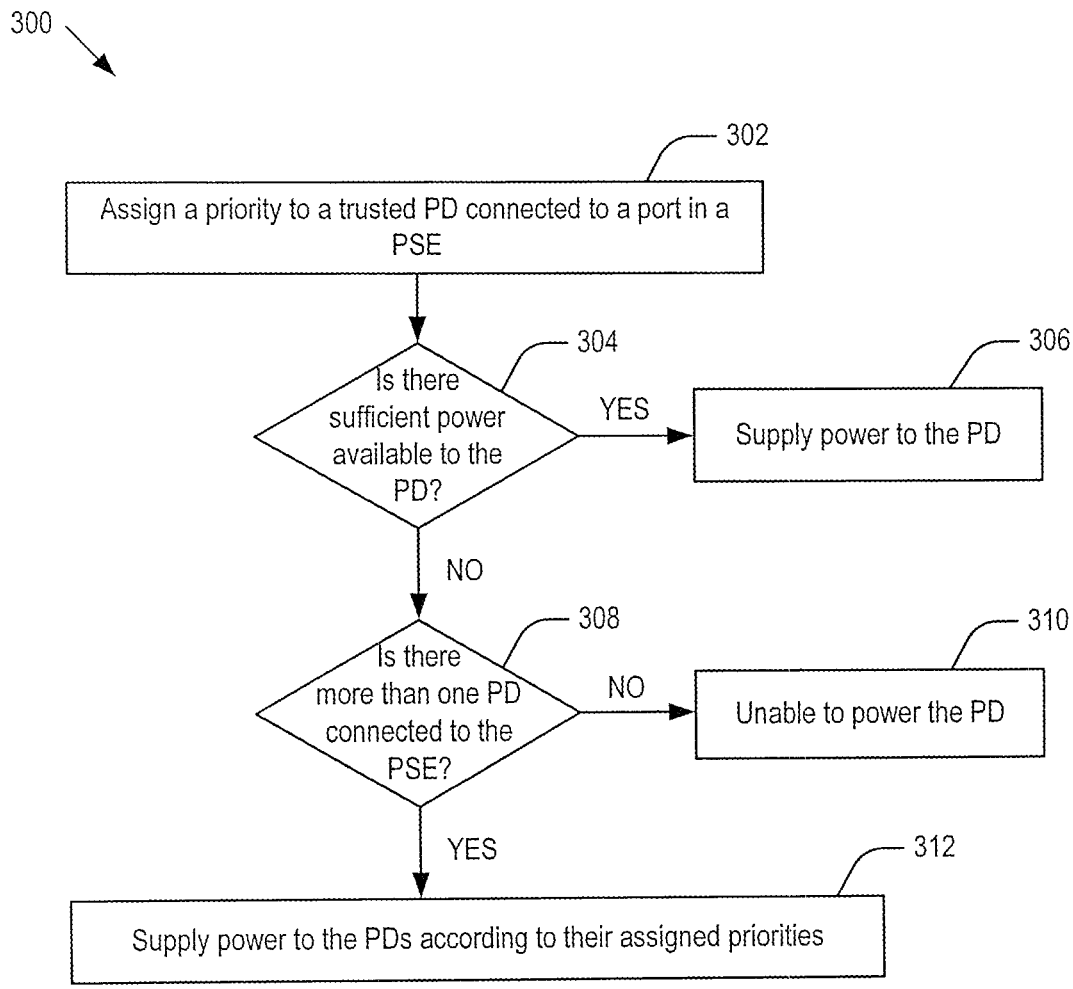
FIG. 3 shows a flowchart of an illustrative process for supplying electrical power to a PD according to embodiments of the present invention.

FIG. 3 shows a flowchart 300 of an illustrative process for supplying electrical power to a trusted PD according to embodiments of the present invention. At step 302, the security manager 103 may assign a priority to a trusted PD 120. In embodiments, the security manager 103 recognizes a priority according to the priority policy. If the security manager 103 cannot recognize the priority, it will assign a default priority to the trusted PD 120. Then, at step 304, the PoE controller 104 determines whether there is sufficient power available to the PD 120. If there is sufficient power, the power supply 108 provides electrical power to the PD 120. If there is not sufficient power, the process proceeds to step 308.

At step 308, the PoE controller 104 determines whether there is more than one PD connected to the PSE 102. If the PD 120 is the only device connected to the ports 106, the PSE 102 is unable to power the PD at step 310. If the PoE controller 104 determines that there is more than one PD connected to the PSE 102, the power supply 108 provides the electrical power to the PDs according to the priorities assigned to them at step 312.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, switch, route, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 4:
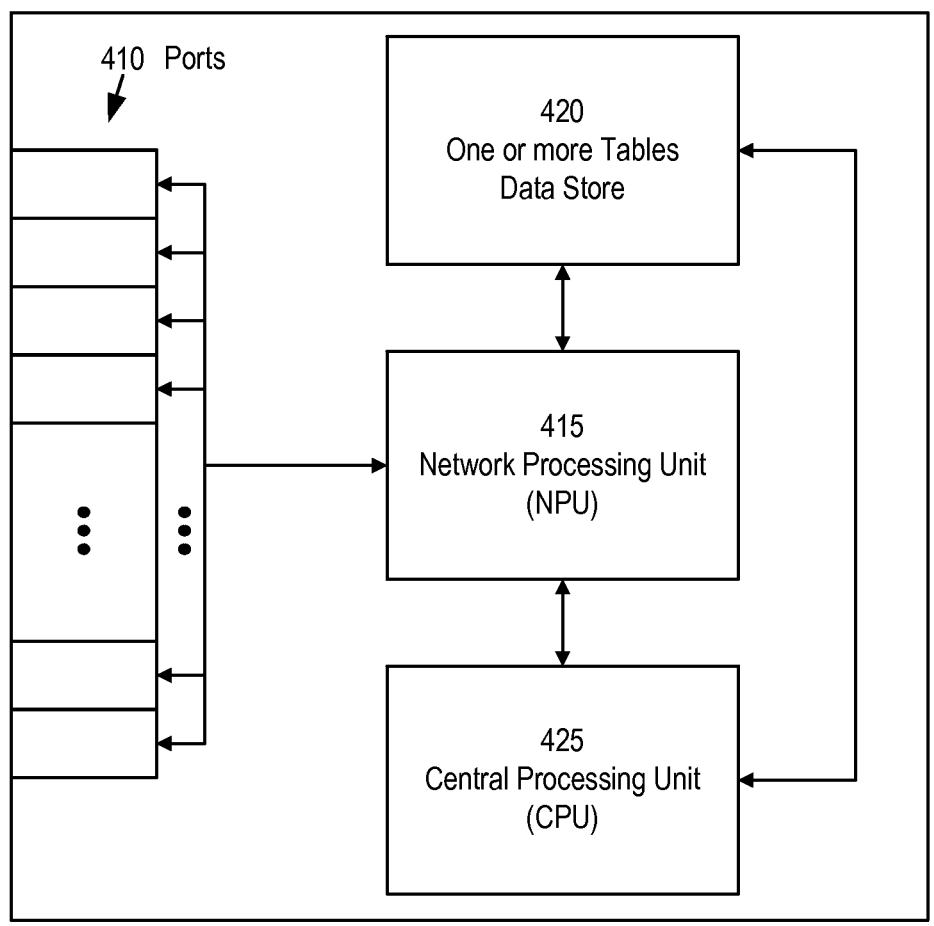
FIG. 4 shows an information handling system according to embodiments of the present invention.

FIG. 4 depicts a simplified block diagram of an information handling system 405 according to embodiments of the present invention. It will be understood that the functionalities shown for device 405 may operate to support various embodiments of an information handling system (or node)—although it shall be understood that an information handling system may be differently configured and include different components. The information handling system 405 may include a plurality of I/O ports 410, a network processing unit (NPU) 415, one or more tables 420, and a central processing unit (CPU) 425. The system includes a power supply (not shown) and may also include other components, which are not shown for sake of simplicity.

In embodiments, the I/O ports 410 may be connected via one or more cables to one or more other network devices or clients. The network processing unit (NPU) 415 may use information included in the network data received at the node 405, as well as information stored in the tables 420, to identify a next hop for the network data, among other possible activities. In embodiments, a switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for controlling power delivery to a port in a power sourcing equipment, the method comprising:

receiving one or more indicators containing an identity from a device connected to the port via a cable for receiving data and electrical power;

determining whether the device is a rogue device or a trusted device by comparing at least one of the one or more indicators to a security policy;

responsive to a determination that the device is a rogue device, not supplying electrical power to the port to power the device via the cable but providing to the port, at least some times, a detecting electrical voltage that is insufficient to power the rogue device but is sufficient to detect that the rogue device is not connected to the port; and responsive to a determination that the device is a trusted device, assigning a priority to the device for delivering power to the device based upon least one of the one or more indicators and a priority policy.

2. A computer-implemented method as recited in claim 1, wherein the security policy includes one or more identities of trusted devices.

3. A computer-implemented method as recited in claim 1, further comprising:

delivering electrical power to the port according to a priority assigned to the device.

4. A computer-implemented method as recited in claim 3, wherein the security policy is applied on per-port level.

5. A computer-implemented method as recited in claim 1, wherein the security policy includes one or more identities of devices to be denied by the power sourcing equipment.

6. A computer-implemented method as recited in claim 1 wherein least one of the one or more indicators comprises a priority indicator and the step of responsive to a determination that the device is a trusted device, assigning a priority to the device for delivering power to the device based upon least one of the one or more indicators and a priority policy comprises assigning a priority to the device using, at least in part, the priority indicator.

7. A computer-implemented method as recited in claim 1 further comprising:

responsive to a plurality of trusted devices being connected to the power sourcing equipment via ports for receiving data and electrical power and responsive to the power sourcing equipment not having sufficient power to power all of the plurality of trusted device connected to the power sourcing equipment, delivering power to a set of one or more trusted devices from the plurality of trusted devices according to priorities assigned to each of the trusted devices.

8. A computer-implemented method as recited in claim 7, wherein the step of delivering power to a set of one or more trusted devices from the plurality of trusted devices according to priorities assigned to each of the trusted devices comprises:

not providing power via a port or ports associated with one or more trusted devices having the lowest priority or priorities so that sufficient power is available for the set of one or more trusted devices from the plurality of trusted devices that do receive power.

9. An information handling system of claim 8, wherein the step of delivering power to a set of one or more trusted devices from the plurality of trusted devices according to priorities assigned to each of the trusted devices comprises:

not providing power via a port or ports associated with one or more trusted devices having the lowest priority or priorities so that sufficient power is available for the set of one or more trusted devices from the plurality of trusted devices that do receive power.

10. A computer-implemented method of claim 1 further comprising:

responsive to determining that the rogue device has disconnected from the port, causing the port to change to an authorized state in which power is available to the port.

11. An information handling system configured to control power delivery to a port in the system, the system comprising:

a controller for controlling electrical power delivery to the port; and a security manager connected to the controller and configured to:

receive one or more indicators containing an identity from a device connected to the port via a cable for receiving data and electrical power;

determine whether the device is a rogue device or a trusted device by comparing at least one of the one or more indicators to a security policy;

responsive to a determination that the device is a rogue device, not supplying electrical power to the port to power the device via the cable but providing to the port, at least some times, a detecting electrical voltage that is insufficient to power the rogue device but is sufficient to detect that the rogue device is not connected to the port; and responsive to a determination that the device is a trusted device, assigning a priority to the device for delivering power to the device based upon least one of the one or more indicators and a priority policy.

12. An information handling system as recited in claim 11, wherein the security policy includes one or more identities of trusted devices.

13. An information handling system as recited in claim 11, wherein the security manager is further configured to:

responsive to a determination that the device is a trusted device, deliver electrical power to the port according to a priority assigned to the device.

14. An information handling system as recited in claim 13, wherein the security policy is applied on per-port level.

15. An information handling system as recited in claim 13, wherein the security policy is applied on per-system level.

16. An information handling system as recited in claim 11, wherein the security policy includes one or more identities of devices to be denied by the information handling system.

17. An information handling system of claim 11 wherein least one of the one or more indicators comprises a priority indicator and the step of responsive to a determination that the device is a trusted device, assigning a priority to the device for delivering power to the device based upon least one of the one or more indicators and a priority policy comprises assigning a priority to the device using, at least in part, the priority indicator.

18. An information handling system of claim 17, wherein the priority indicator from the device is received via one or more type-length-value (TLV) fields.

19. An information handling system of claim 11 further comprising:

responsive to a plurality of trusted devices being connected to the power sourcing equipment via ports for receiving data and electrical power and responsive to the power sourcing equipment not having sufficient power to power all of the plurality of trusted device connected to the power sourcing equipment, delivering power to a set of one or more trusted devices from the plurality of trusted devices according to priorities assigned to each of the trusted devices.

20. An information handling system of claim 11 wherein the security manager is further configured to:

responsive to determining that the rogue device has disconnected from the port, causes the controller to return the port to an authorized state in which power is available to the port.

* * * * *